(12) United States Patent
Kang et al.

(10) Patent No.: US 9,667,105 B2
(45) Date of Patent: May 30, 2017

(54) MOTOR ROTOR AND POSITIONING RING THEREOF

(71) Applicant: DELTA ELECTRONICS, INC., Taoyuan County (TW)

(72) Inventors: Chao-Hsing Kang, Taoyuan County (TW); Chien-Ho Lee, Taoyuan County (TW); Tsung-Yin Lee, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 230 days.

(21) Appl. No.: 14/718,953

(22) Filed: May 21, 2015

(65) Prior Publication Data
US 2015/0340916 A1    Nov. 26, 2015

Related U.S. Application Data

(60) Provisional application No. 62/001,898, filed on May 22, 2014.

(51) Int. Cl.
| | |
|---|---|
| H02K 21/12 | (2006.01) |
| H02K 1/16 | (2006.01) |
| F04D 17/08 | (2006.01) |
| F04D 19/00 | (2006.01) |
| F04D 29/053 | (2006.01) |
| F04D 29/28 | (2006.01) |
| F04D 29/32 | (2006.01) |
| H02K 1/27 | (2006.01) |

(Continued)

(52) U.S. Cl.
CPC ............... *H02K 1/16* (2013.01); *F04D 17/08* (2013.01); *F04D 19/002* (2013.01); *F04D 25/0613* (2013.01); *F04D 29/053* (2013.01); *F04D 29/281* (2013.01); *F04D 29/325* (2013.01); *F04D 29/329* (2013.01); *F04D 29/646* (2013.01); *H02K 1/2786* (2013.01); *H02K 1/30* (2013.01); *H02K 5/10* (2013.01); *H02K 5/225* (2013.01); *H02K 7/14* (2013.01); *H02K 9/06* (2013.01)

(58) Field of Classification Search
CPC ......... H02K 1/278; H02K 1/2786; H02K 1/30
USPC ............ 310/156.12, 156.13, 156.22, 156.28, 310/156.29
See application file for complete search history.

(56) References Cited

U.S. PATENT DOCUMENTS

| | | | | |
|---|---|---|---|---|
| 2,877,366 | A * | 3/1959 | Carr ....................... | H02K 1/276 310/156.08 |
| 6,657,347 | B2 * | 12/2003 | Pfetzer .................. | H02K 1/278 310/156.01 |

(Continued)

*Primary Examiner* — Thanh Lam
(74) *Attorney, Agent, or Firm* — Hauptman Ham, LLP

(57) ABSTRACT

A motor rotor includes a cylindrical housing, a positioning ring and a plurality of magnets. The cylindrical housing includes a plurality of securing holes. The positioning ring is disposed on the cylindrical housing. The positioning ring is disposed with a plurality of flexible ribs and a plurality of securing ribs disposed corresponding thereto. Each of the flexible ribs is radially pressable. The flexible ribs are disposed in the cylindrical housing, and each of the securing ribs is inserted in a respective corresponding one of the securing holes. The magnets are disposed in the cylindrical housing. Each of the magnets is clamped between the adjacent flexible ribs and is arranged annularly along an inner wall of the cylindrical housing, so as to facilitate assembly.

20 Claims, 19 Drawing Sheets

(51) Int. Cl.
　　　*H02K 1/30*　　　(2006.01)
　　　*H02K 5/10*　　　(2006.01)
　　　*H02K 5/22*　　　(2006.01)
　　　*H02K 7/14*　　　(2006.01)
　　　*F04D 25/06*　　(2006.01)
　　　*F04D 29/64*　　(2006.01)
　　　*H02K 9/06*　　　(2006.01)

(56) References Cited

U.S. PATENT DOCUMENTS

| | | | | |
|---|---|---|---|---|
| 6,822,359 | B2 * | 11/2004 | Joho | H02K 1/223 |
| | | | | 310/156.23 |
| 2003/0193255 | A1 * | 10/2003 | Ludwig | H02K 1/278 |
| | | | | 310/156.31 |
| 2008/0083112 | A1 * | 4/2008 | Tapper | H02K 1/2773 |
| | | | | 29/598 |
| 2008/0278018 | A1 * | 11/2008 | Achor | F02M 37/08 |
| | | | | 310/156.12 |
| 2011/0187219 | A1 * | 8/2011 | Okitsu | H02K 1/278 |
| | | | | 310/156.28 |
| 2014/0132121 | A1 * | 5/2014 | Gan | H02K 21/227 |
| | | | | 310/67 A |

* cited by examiner

MOTOR ROTOR AND POSITIONING RING THEREOF

CROSS-REFERENCE TO RELATED APPLICATION

This patent application claims the benefit of U.S. Provisional Patent Application No. 62/001,898, filed May 22, 2014, which is incorporated by reference herein.

BACKGROUND

1. Technical Field

The present invention relates to a large-sized fan motor and, in particular, to a motor rotor having a positioning ring.

2. Related Art

The present invention relates to a motor rotor for a large-sized fan motor. The motor rotor generally includes a cylindrical housing, and permanent magnets and a rotation shaft are disposed in the cylindrical housing. The motor rotor is pivotally disposed on a stator base by means of the rotation shaft, so that the motor rotor is rotatable about the rotation shaft with respect to a stator base. Generally, the permanent magnets are arranged and aligned by manpower and are adhered by adhesives into the cylindrical housing, so assembling is labor and time consuming, and precision for assembly and stability for production are also compromised, which is not economic.

In view of the foregoing, the inventor made various studies to improve the above-mentioned problems, on the basis of which the present invention is accomplished.

BRIEF SUMMARY

The present invention provides a positioning ring and a motor rotor having a positioning ring The present invention provides a motor rotor which comprises a cylindrical housing, a positioning ring and a plurality of magnets. The cylindrical housing is formed of a plurality of securing holes. The positioning ring is disposed on the cylindrical housing. The positioning ring is disposed with a plurality of flexible ribs and a plurality of securing ribs disposed corresponding to the securing holes. Each of the flexible ribs is radially pressable. Each of the flexible ribs is disposed in the cylindrical housing. Each of the securing ribs is inserted in a respective corresponding one of the securing holes. The magnets are disposed in the cylindrical housing. Each of the magnets is clamped between the adjacent flexible ribs and is arranged annularly along an inner wall of the cylindrical housing.

The present invention further provides a positioning ring configured to position magnets of a motor rotor in a cylindrical housing thereof. The positioning ring is disposed with a plurality of flexible ribs, extending parallel to an axial direction of the positioning ring, and a plurality of securing ribs. The flexible ribs are disposed in the cylindrical housing. Each of the flexible ribs is radially pressable, and the flexible ribs extend in a direction opposite to that in which the securing ribs extend. Each of the magnets is clamped between the adjacent flexible ribs, and the securing ribs are engaged with the cylindrical housing for securement.

The present invention further provides another positioning ring configured to position magnets of a motor rotor in a cylindrical housing thereof. The positioning ring is disposed with a plurality of flexible ribs, extending along an axial direction of the positioning ring, and a plurality of securing ribs extending in the same direction as the flexible ribs. The flexible ribs are disposed in the cylindrical housing. Each of the flexible ribs is radially pressable. Each of the magnets is clamped between the adjacent flexible ribs, and the securing ribs are engaged with the cylindrical housing for securement.

According to the present invention, the magnets in the motor rotor are positioned, arranged and assembled by means of the positioning ring.

DETAILED DESCRIPTION

Figure 1:
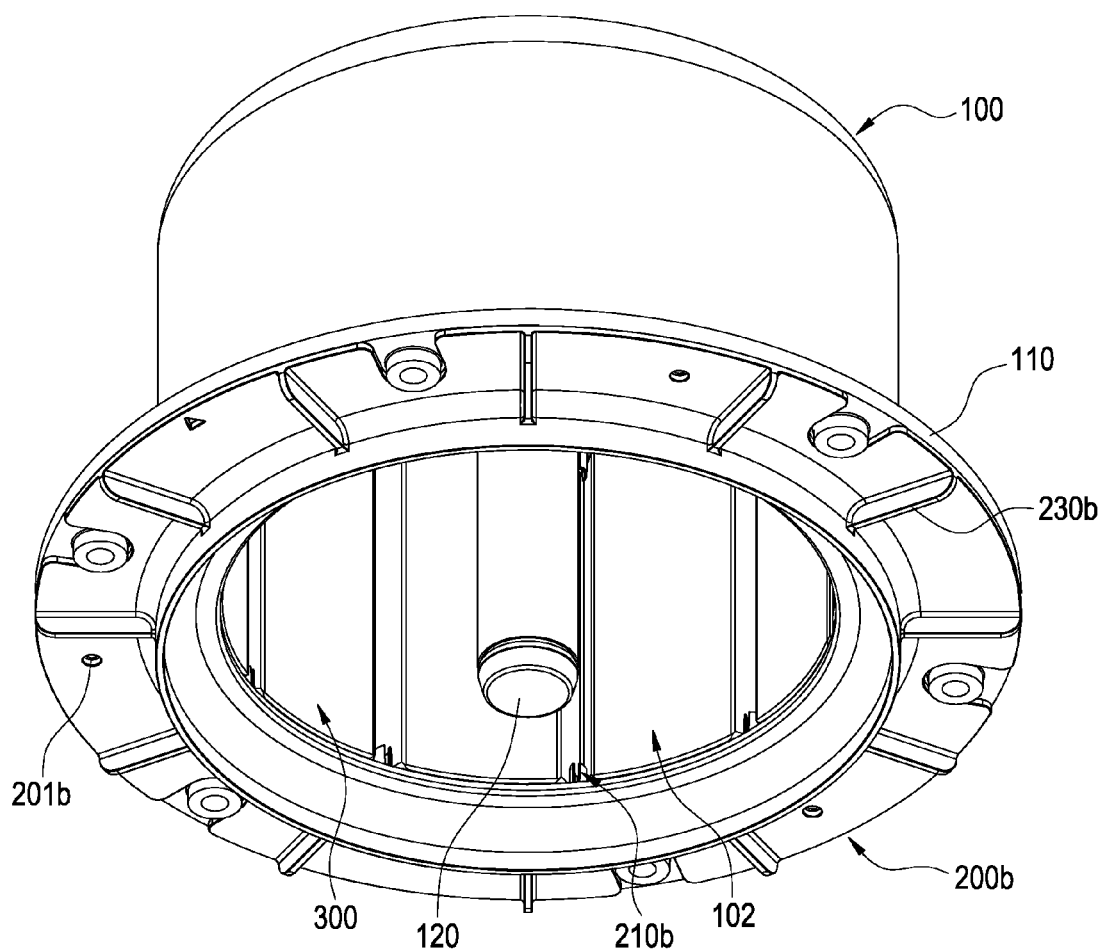
FIG. 1 is a perspective view of a motor rotor according to a first embodiment of the present invention.
Figure 2:
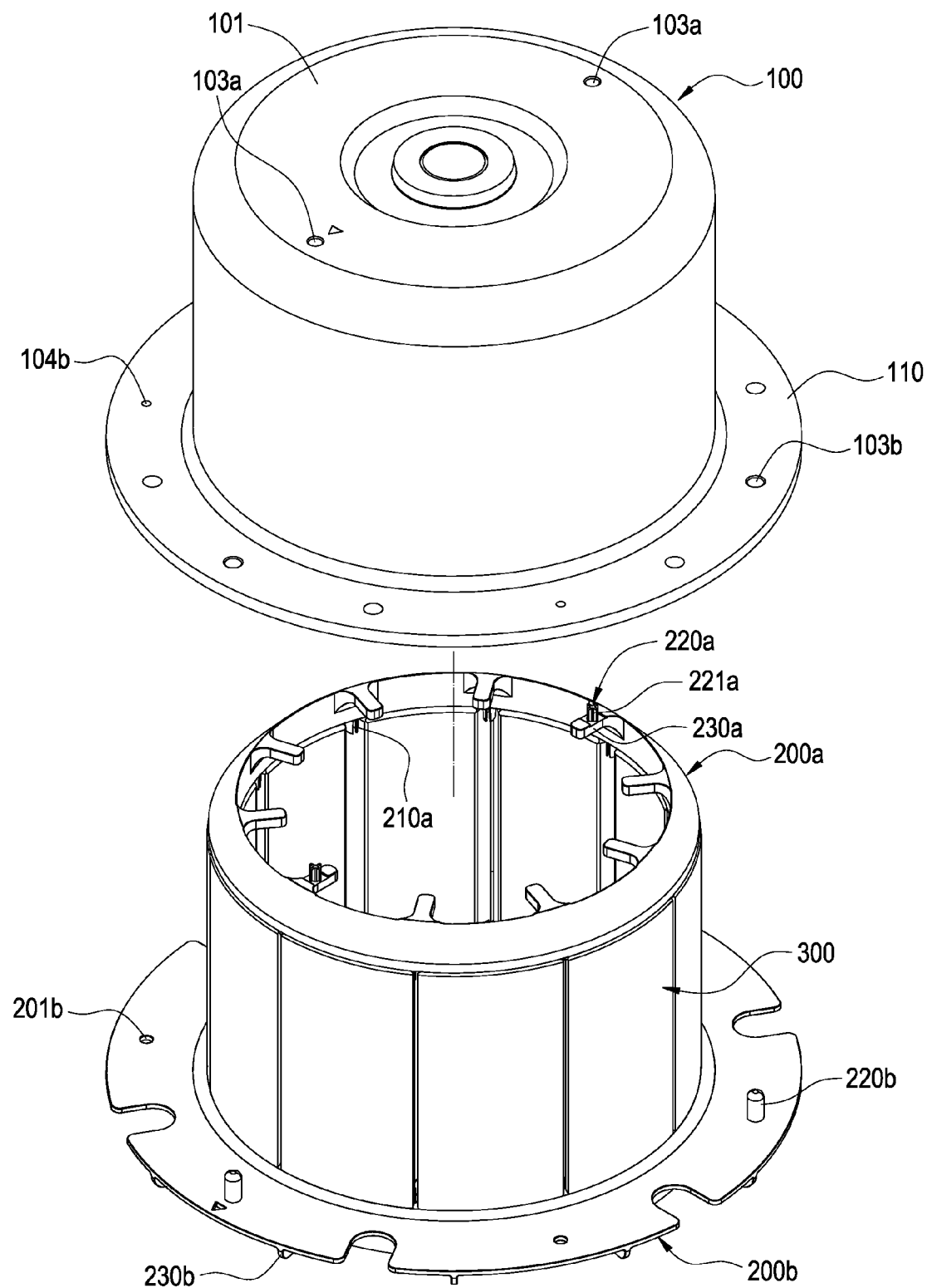
FIG. 2 is a perspective exploded view of the motor rotor according to the first embodiment of the present invention.
Figure 3:
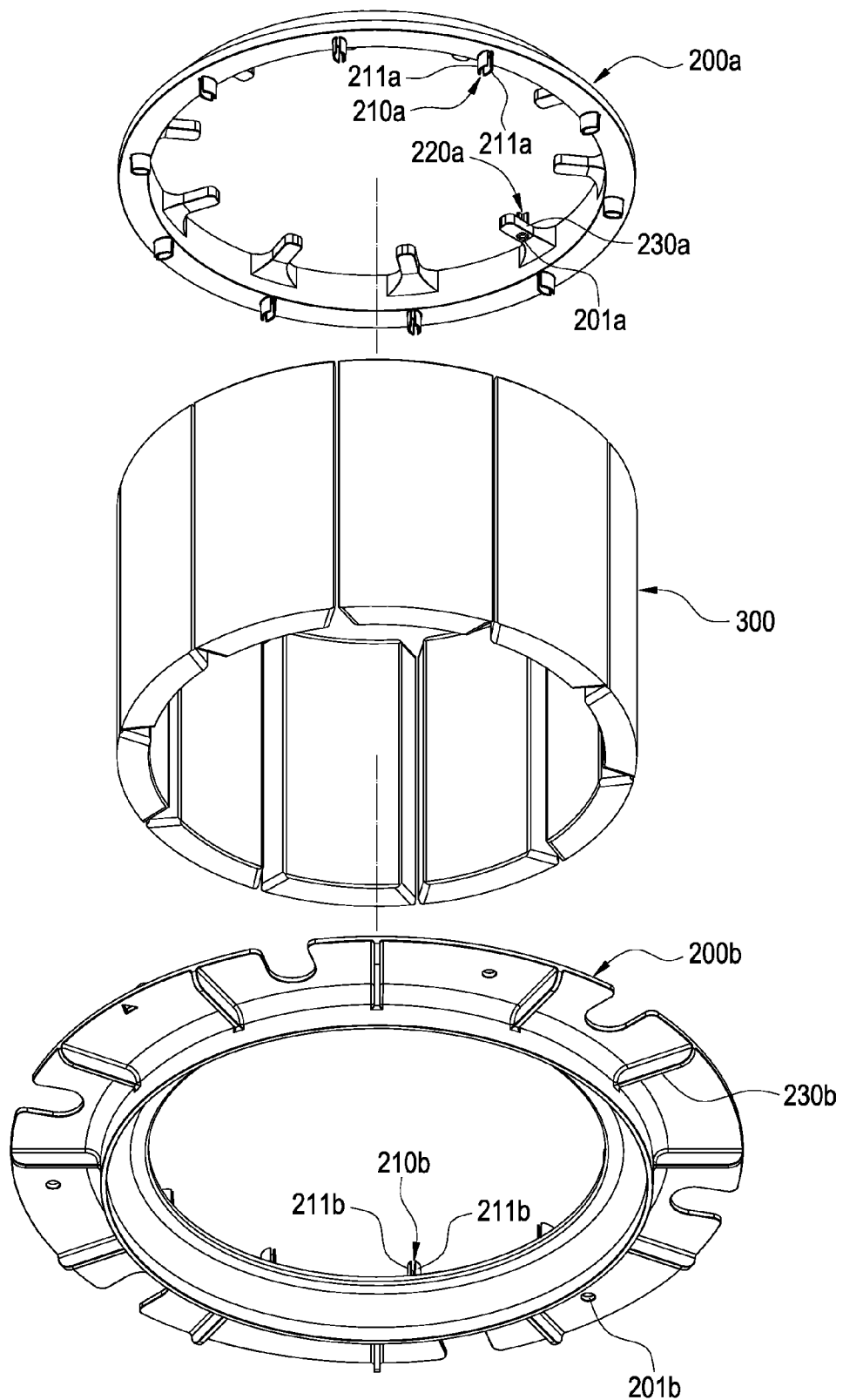
FIG. 3 is a perspective exploded view showing a positioning ring and magnets according to the first embodiment of the present invention.
Figure 4:
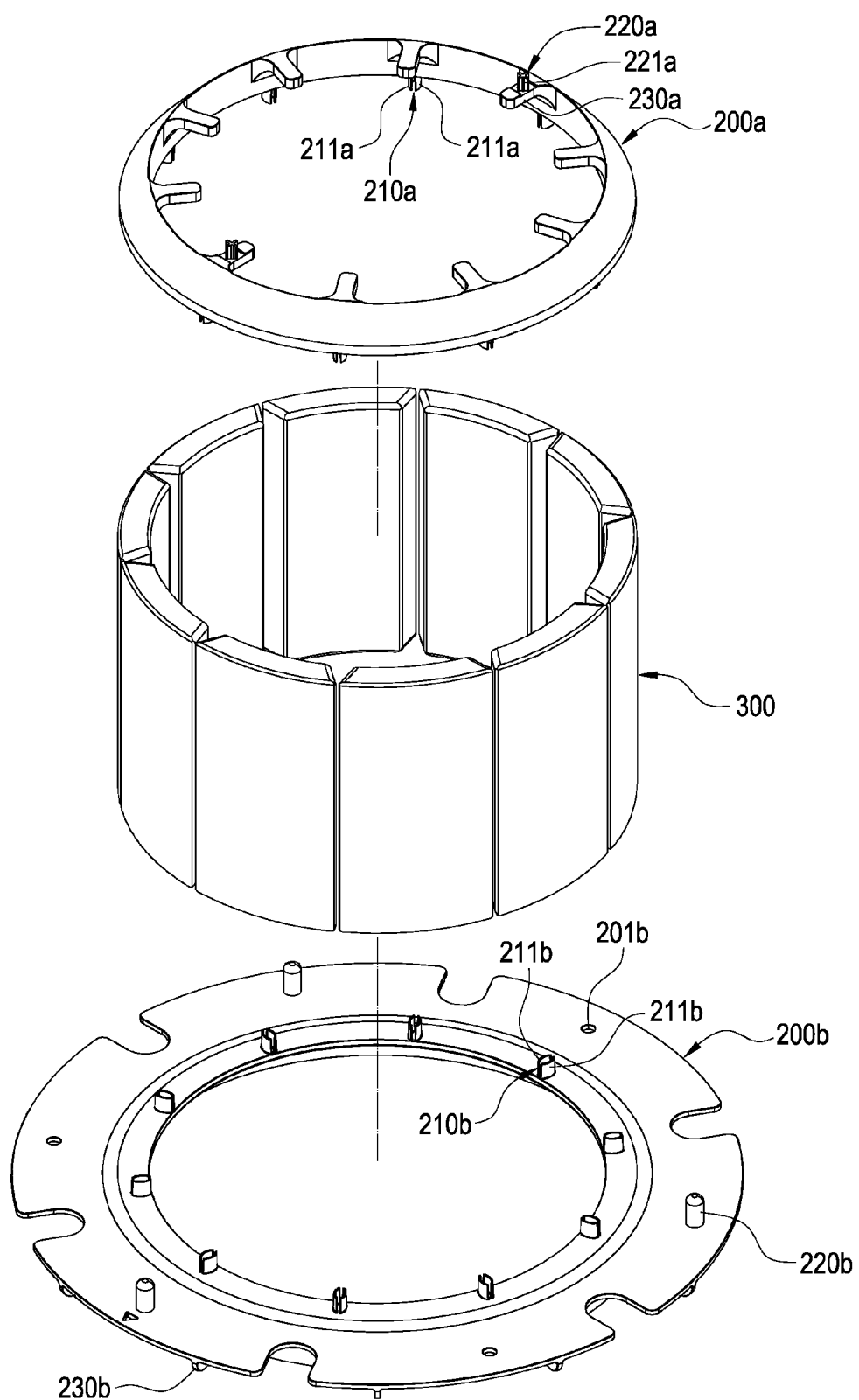
FIG. 4 is another perspective exploded view showing the positioning ring and the magnets according to the first embodiment of the present invention.
Figure 5:
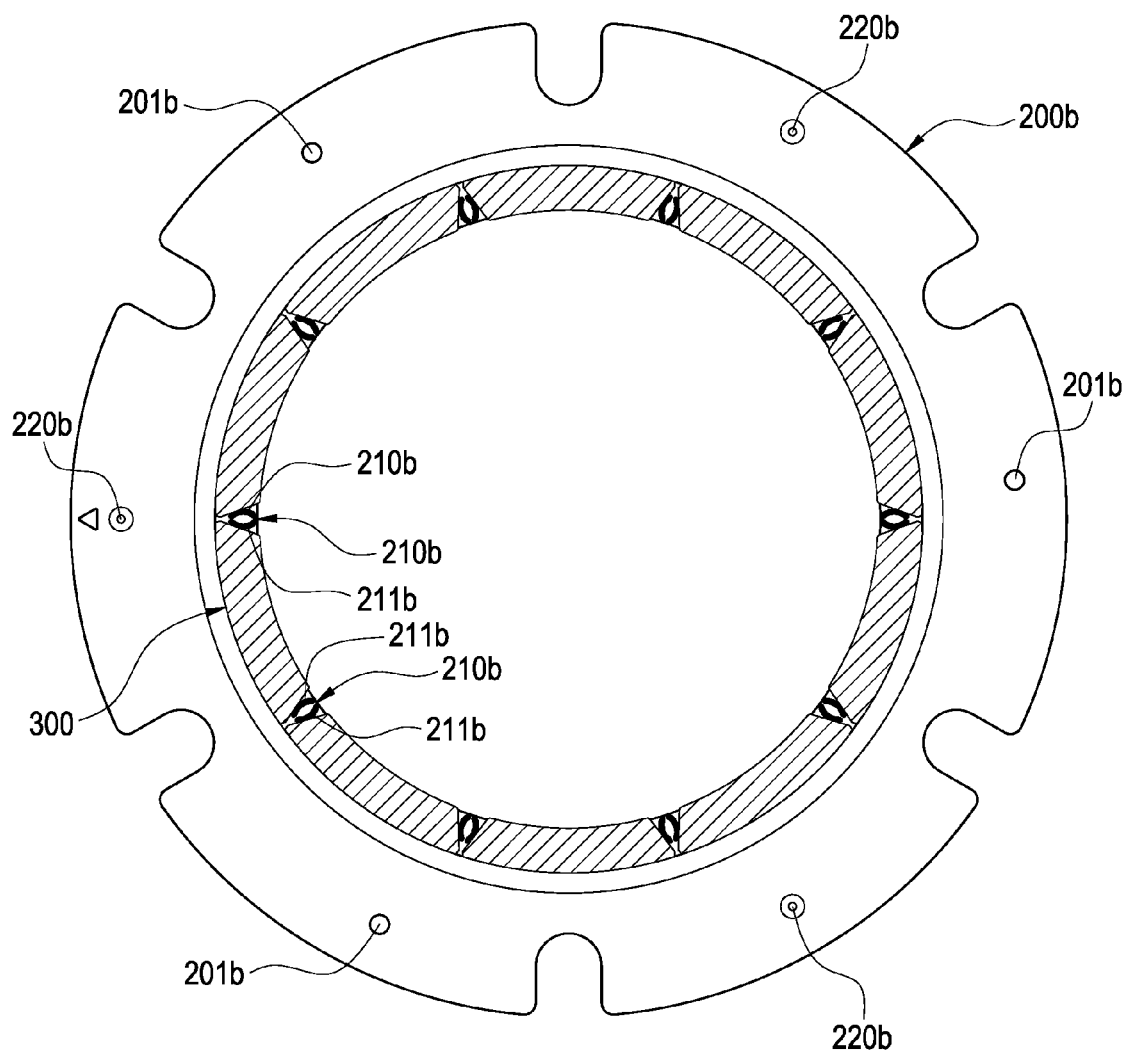
FIG. 5 is a schematic view showing a combination of the positioning ring and the magnets according to the first embodiment of the present invention.
Figure 6:
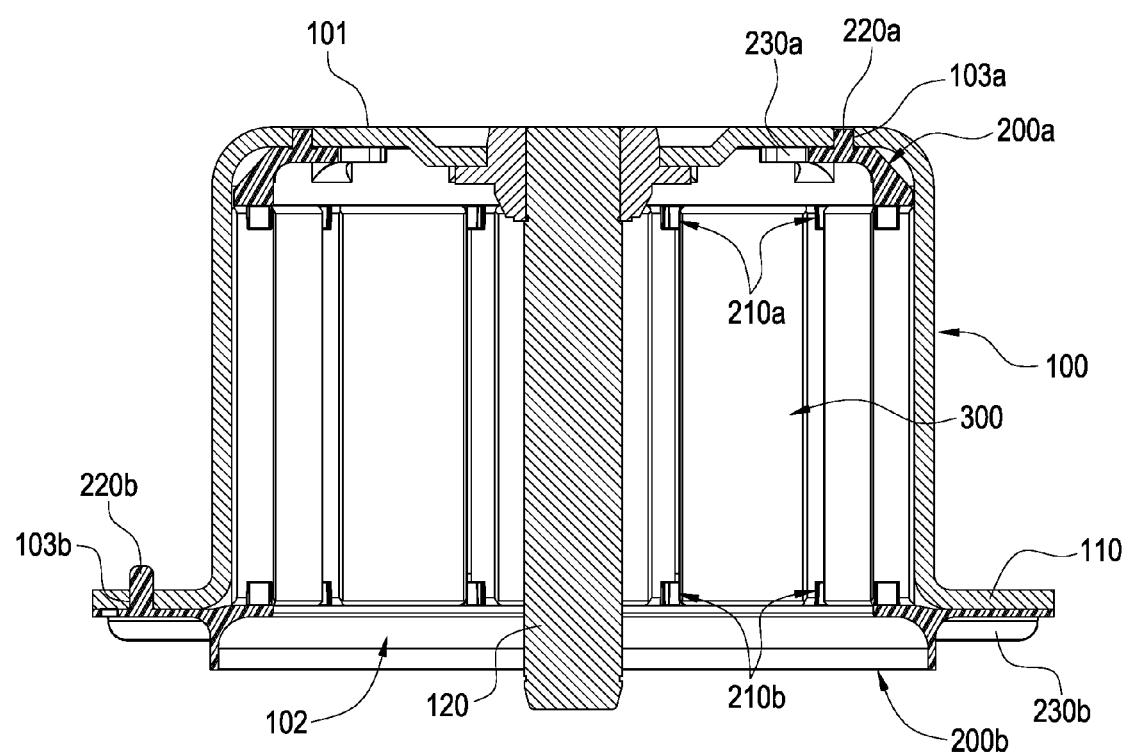
FIG. 6 is a longitudinal cross-sectional view of the motor rotor according to the first embodiment of the present invention.

Referring to FIGS. 1 and 2, a first embodiment of the present invention provides a motor rotor which comprises a cylindrical housing 100, a pair of positioning rings 200a, 200b, and a plurality of magnets 300.

According to the present embodiment, the cylindrical housing 100 is a metallic cylinder. One end of the cylindrical housing 100 is closed and forms a top portion 101, and the other end of the cylindrical housing 100 is open and forms an opening 102. A ring-shaped flange 110 extends along a radial direction of the cylindrical housing 100 from an outer circumferential edge of the opening 102. A plurality of securing holes 103a corresponding to the positioning ring 200a and a plurality of securing holes 103b corresponding to the positioning ring 200b are formed on the cylindrical housing 100. In the present embodiment, the securing holes 103a corresponding to the positioning ring 200a are formed on and penetrate through the top portion 101 of the cylindrical housing 100, and the securing holes 103b corresponding to the other positioning ring 200b are formed on and penetrate through the flange 110 of the cylindrical housing 100. A plurality of first screw holes 104b are formed on the flange 110. A rotation shaft 120 is disposed in the cylindrical housing 100. The rotation shaft 120 extends from an inner surface of the top portion 101 of the cylindrical housing 100 to the opening 102 and is disposed along an axial direction of the cylindrical housing 100.

Referring to FIGS. 1 to 6, the positioning rings 200a and 200b are disposed on the cylindrical housing 100. A plurality of flexible ribs 210a/210b is disposed on the positioning ring 200a/200b, and a plurality of securing ribs 220a/220b is disposed on the positioning ring 200a/200b. The flexible ribs 210a extend parallel to an axial direction of the positioning ring 200a, and the flexible ribs 210b extend parallel to an axial direction of the positioning ring 200b. The flexible ribs 210a and 210b are disposed in the cylindrical housing 100. According to the present embodiment, each flexible rib 210a/210b preferably consists of two arc members 211a, 211b which are arranged juxtaposed and spaced apart, so the flexible rib 210a/210b is radially pressable; however, the present invention is not intended to limit the form of the flexible rib 210a/210b. The securing ribs 220a are disposed corresponding to the securing holes 103a, and the securing ribs 220b are disposed corresponding to the securing holes 103b. The securing ribs 220a/220b extend parallel to the axial direction of the positioning ribs 200a/200b. Each of the securing ribs 220a/220b is inserted in a respective corresponding one of the securing holes 103a/103a so as to fix the positioning ring 200a/200b to the cylindrical housing 100.

In the present embodiment, the positioning ring 200a is disposed in the cylindrical housing 100, and each securing rib 220a on the positioning ring 200a is inserted into a respective corresponding one of the securing holes 103a on the top portion 101 of the cylindrical housing 100, and such that the positioning ring 200a is secured to an inner wall of the top portion 101 of the cylindrical housing 100. In order to prevent water accumulation on the top portion 101 of the cylindrical housing 100, a bottom portion of each of the securing ribs 220a includes at least one drainage hole 201a penetrating through the positioning ring 200a. (In the present embodiment, there is preferably a plurality of the drainage holes 201a.) A lateral side of each of the securing ribs 220a is formed with a drainage trench 221a longitudinally passing through the securing rib 220a and communicating with the drainage hole 201a. Therefore, when water is accumulated on the top portion 101 of the cylindrical housing 100, the accumulated water passes through the drainage hole 201a and the drainage trench 221a to drain out of the cylindrical housing 100. A plurality of flow disturbance members 230a extend from an inner circumferential surface of the positioning ring 200a along a radial direction thereof and are arranged in a radial pattern. When the motor rotor rotates, the flow disturbance members 230a disturb a flow of the air in the cylindrical housing 100 to generate airflow to cool the motor. In the present embodiment, the securing rib 220a of the positioning ring 200a extends from one side of the flow disturbance member 230a; however, the present invention is not intended to limit the relative relationship between the securing rib 220a and the flow disturbance member 230a.

In the present embodiment, the other positioning ring 200b is attached to the flange 110 of the cylindrical housing 100. One side of the positioning ring 200b is attached to the flange 110. A plurality of second screw holes 201b corresponding to the first screw holes 104b are formed on the positioning ring 200b. The first screw holes 104b and the second screw holes 201b corresponding thereto are for insertion of screws, so as to screw the positioning ring 200b onto the flange 110 of the cylindrical housing 100. A ring-shaped baffle wall 240 protrudes from the other side of the positioning ring 200b. A plurality of flow disturbance members 230b protrudes from an outer circumferential edge of the baffle wall 240. Each of the flow disturbance members is a blade. Each of the flow disturbance members 230b extend along a radial direction of the positioning ring 200b, and the flow disturbance members 230b are arranged in a radial pattern. When the motor rotor rotates, the flow disturbance members 230b disturb a flow of the air nearby to generate airflow to cool the motor.

The magnets 300 are disposed in the cylindrical housing 100. Each of the magnets 300 is elongated rectangular in shape and has an arc cross-section. The magnets 300 are each clamped between any adjacent flexible ribs 210a/210b on the positioning rings 200a/200b. The flexible ribs 210a/210b are radially pressable, thereby exerting elastic forces to clamp and fix the magnets 300, so that two ends of each magnet 300 are positioned by the positioning rings 200a, 200b respectively, and accordingly the magnets 300 are arranged annularly along an inner wall of the cylindrical housing 100.

Figure 7:
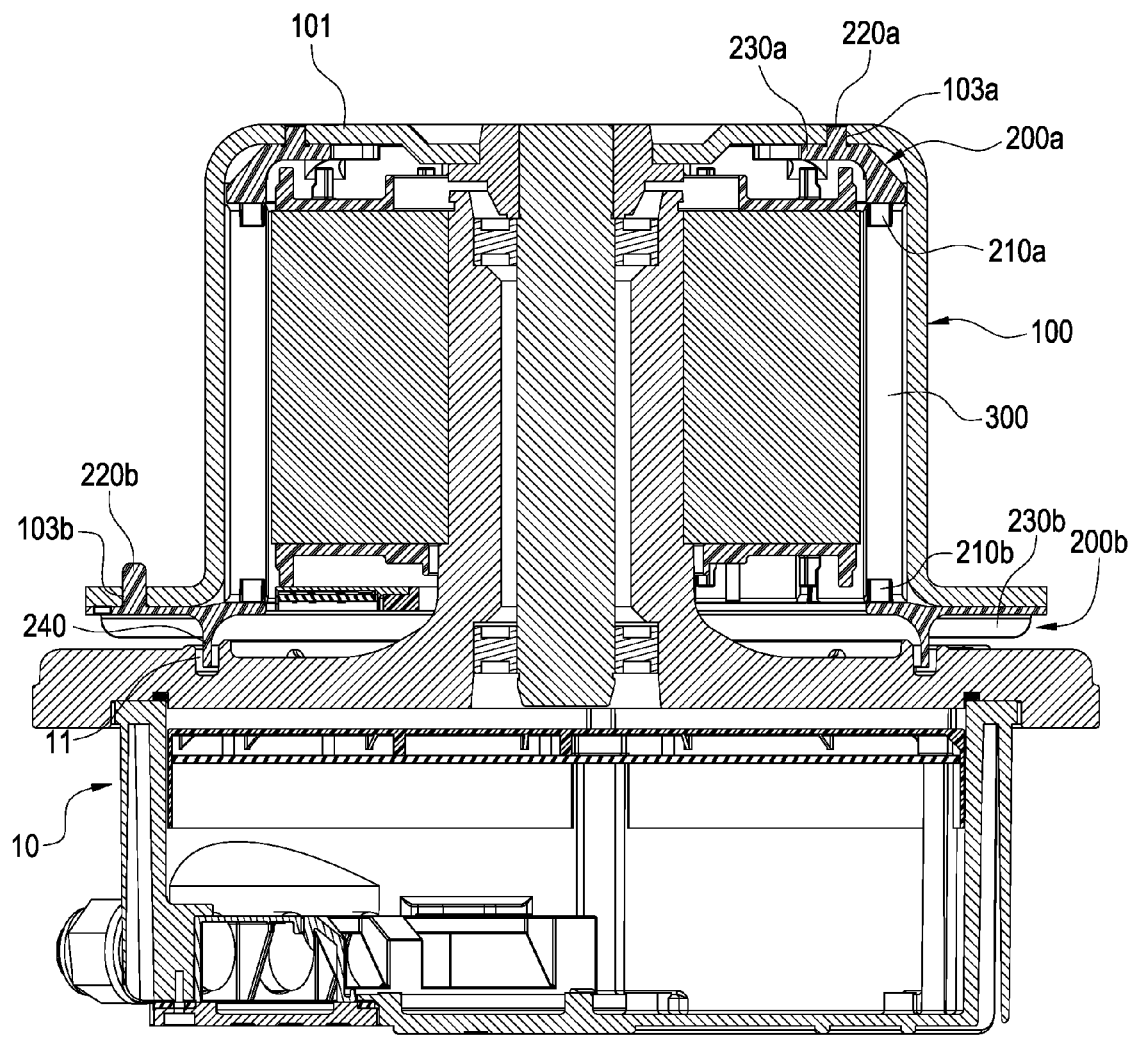
FIG. 7 is an installation view of the motor rotor according to the first embodiment of the present invention.
Figure 8:
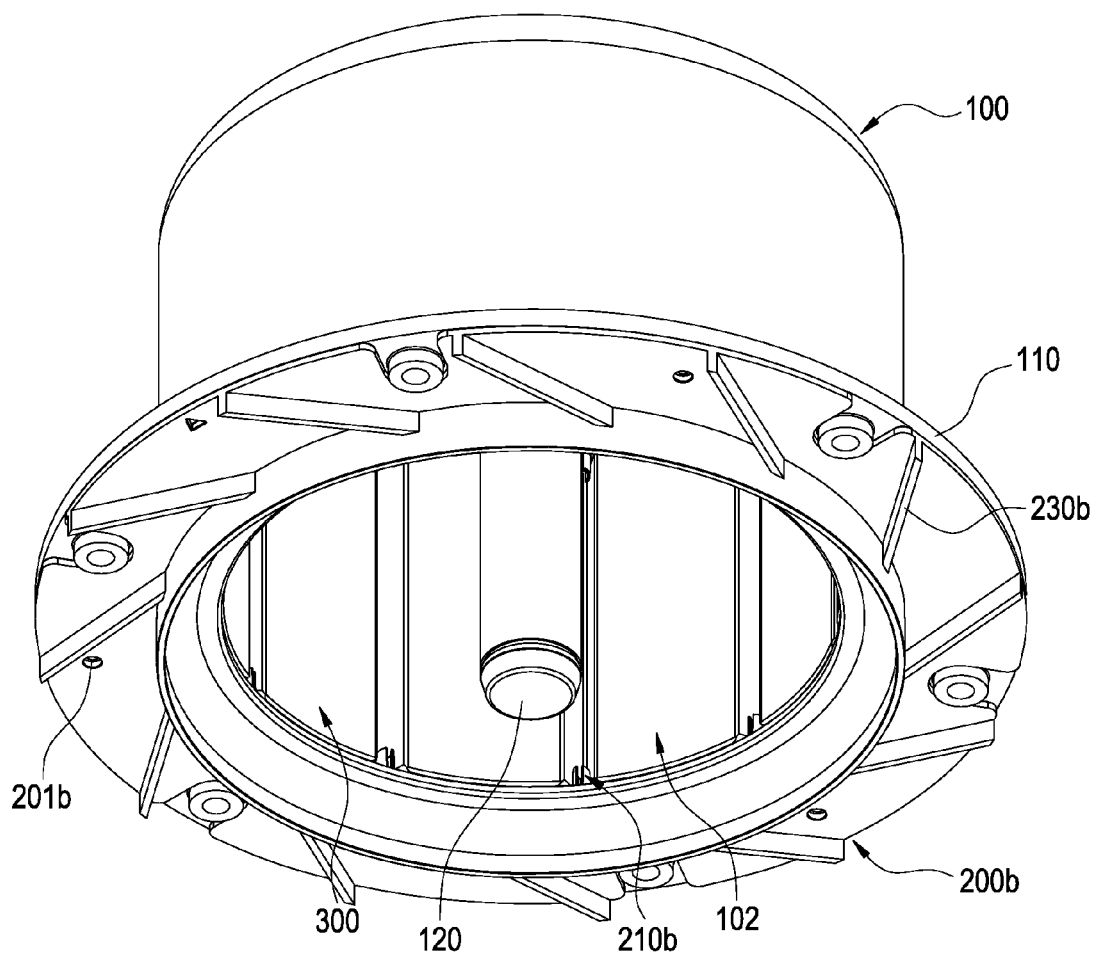
FIG. 8 is a perspective view of a motor rotor according to a second embodiment of the present invention.
Figure 9:
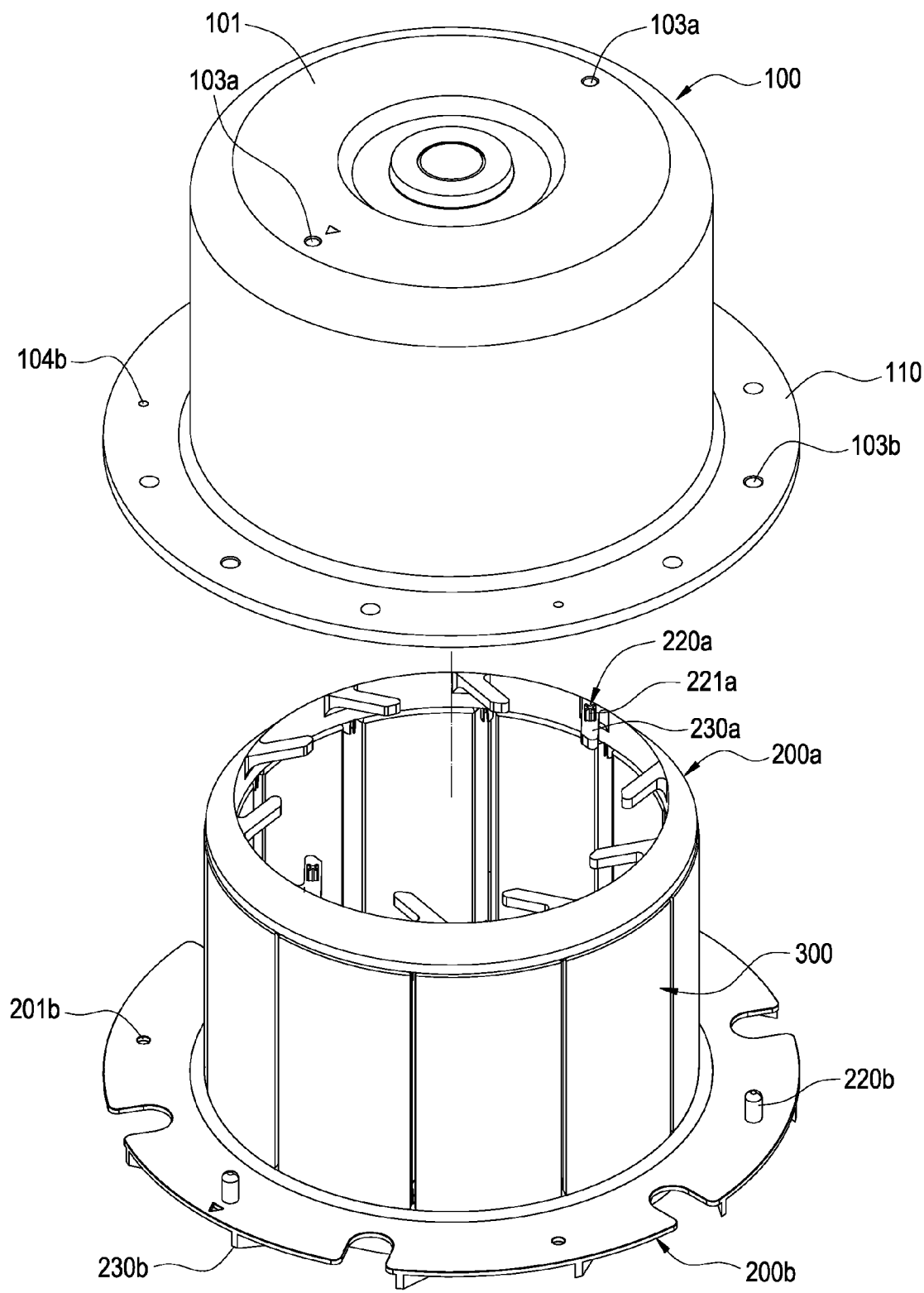
FIG. 9 is a perspective exploded view of the motor rotor according to the second embodiment of the present invention.
Figure 10:
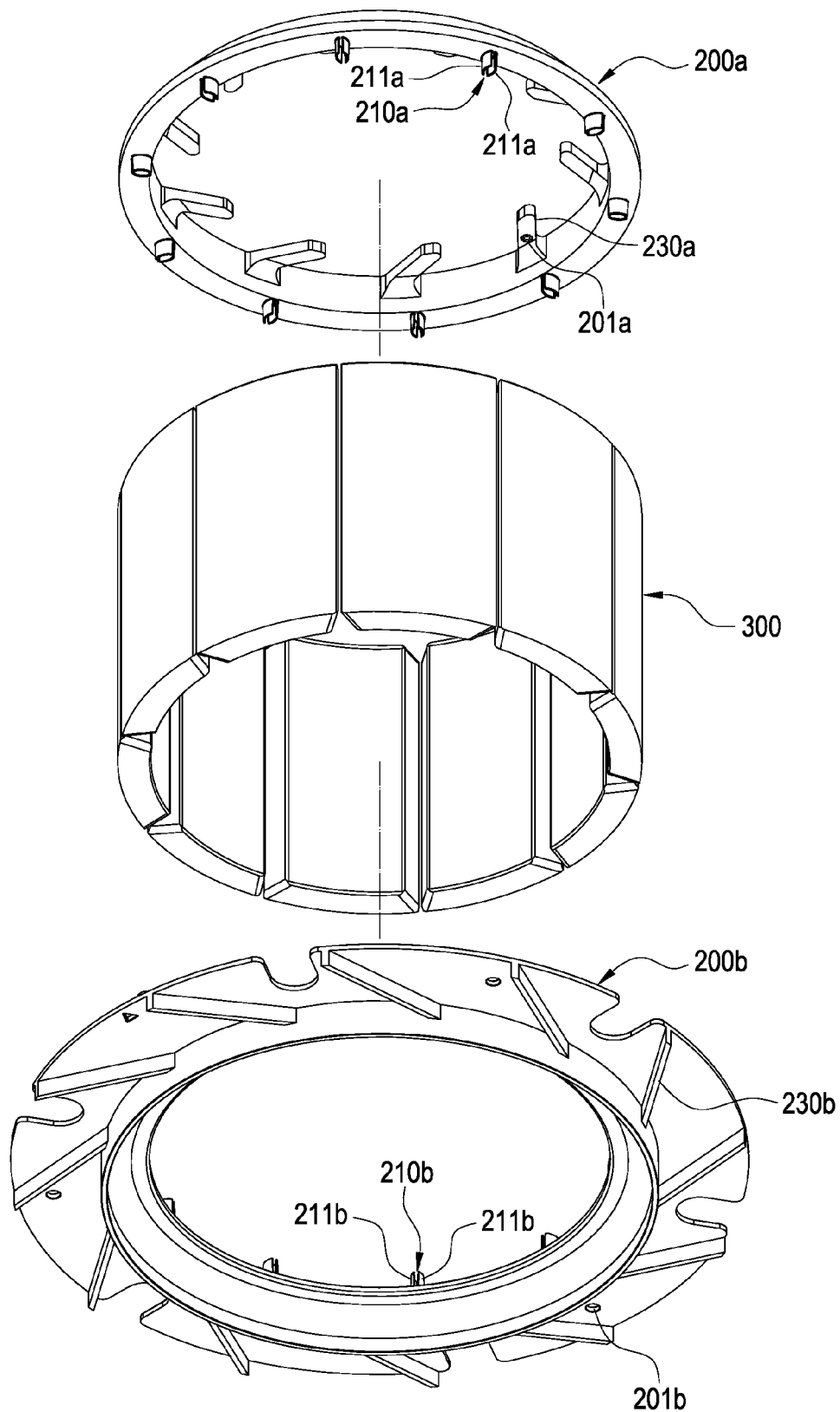
FIG. 10 is a perspective exploded view of the motor rotor according to the second embodiment of the present invention.
Figure 11:
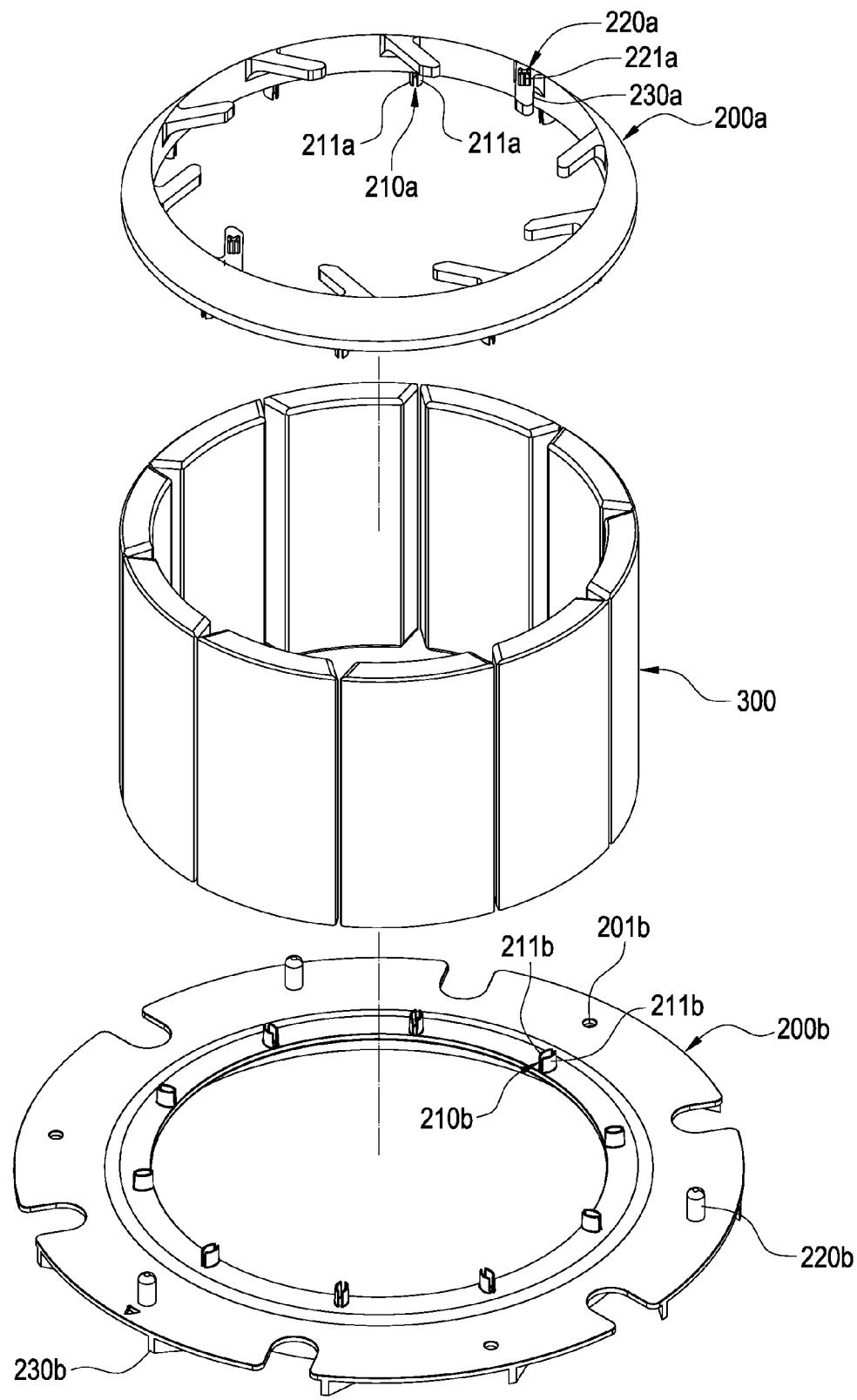
FIG. 11 is another perspective exploded view of the motor rotor according to the second embodiment of the present invention.

Referring to FIG. 7, the motor rotor is pivotally disposed on the stator base 10 by means of the rotation shaft 120, so rotatable on the stator base 10. A ring-shaped waterproof trench 11 is disposed on the stator base 10. The baffle wall 240 on the positioning ring 200b extends into the ring-shaped waterproof trench 11, so as to prevent most of the water from entering into between the motor rotor and the stator base 10 when the motor rotor rotates.

Referring to FIGS. 8 to 11, the second embodiment of the present invention provides a motor rotor which includes a cylindrical housing 100, a pair of positioning rings 200a, 200b and a plurality of magnets 300.

In the present embodiment, the cylindrical housing 100 is a metallic cylinder. One end of the cylindrical housing 100 has a top portion 101 and is closed. The other end of the cylindrical housing 100 is open and forms an opening 102. A ring-shaped flange 110 extends outwardly from an outer circumferential edge of the opening 102 along a radial direction of the cylindrical housing 100. A plurality of securing holes 103a corresponding to the positioning ring 200a and a plurality of securing holes 103b corresponding to the positioning ring 200b are formed on the cylindrical housing 100. In the present embodiment, the securing holes 103a corresponding to the positioning ring 200a are formed on the top portion 101 of the cylindrical housing 100. The securing holes 103b corresponding to the other positioning ring 200b are formed on the flange 110 of the cylindrical housing 100. A plurality of first screw holes 104b are formed on the flange 110. A rotation shaft 120 is disposed in the cylindrical housing 100. The rotation shaft 120 extends from an inner surface of the top portion 101 of the cylindrical housing 100 to the opening 102 and is disposed along an axial direction of the cylindrical housing 100.

The positioning rings 200a and 200b are disposed on the cylindrical housing 100. A plurality of flexible ribs 210a/210b is disposed on the positioning ring 200a/200b, and a plurality of securing ribs 220a/220b is disposed on the positioning ring 200a/200b. The flexible ribs 210a extend parallel to an axial direction of the positioning ring 200a, and the flexible ribs 210b extend parallel to an axial direction of the positioning ring 200b. The flexible ribs 210a and 210b are disposed in the cylindrical housing 100. In the present embodiment, each flexible rib 210a/210b preferably consists of two arc members 211a, 211b which are arranged juxtaposed and spaced apart, so the flexible rib 210a/210b is radially pressable; however, the present invention is not intended to limit the form of the flexible rib 210a/210b. The securing ribs 220a are disposed corresponding to the securing holes 103a, and the securing ribs 220b are disposed corresponding to the securing holes 103b. The securing ribs 220a/220b extend parallel to the axial direction of the positioning ribs 200a/200b. Each of the securing ribs 220a/220b is inserted in a respective corresponding one of the securing holes 103a/103b, so as to fix the positioning ring 200a/200b to the cylindrical housing 100.

In the present embodiment, the positioning ring 200a is disposed in the cylindrical housing 100, and each securing rib 220a on the positioning ring 200a is inserted into a respective corresponding one of the securing holes 103a on the top portion 101 of the cylindrical housing 100, and such that the positioning ring 200a is secured to an inner wall of the top portion 101 of the cylindrical housing 100. In order to prevent water accumulation on the top portion 101 of the cylindrical housing 100, a bottom portion of each of the securing ribs 220a includes at least one drainage hole 201a penetrating through the positioning ring 200a. (In the present embodiment, there is preferably a plurality of the drainage holes 201a.) A lateral side of each of the securing ribs 220a is formed with a drainage trench 221a longitudinally passing through the securing rib 220a, and each of the drainage trenches 221a communicates with the drainage hole 201a. Therefore, when water is accumulated on the top portion 101 of the cylindrical housing 100, the accumulated water passes through the drainage hole 201a and the drainage trench 221a to drain out of the cylindrical housing 100.

A plurality of flow disturbance members 230a extends inwardly from an inner circumferential surface of the positioning ring 200a. Each of the flow disturbance members 230a is inclined with respect to the radial direction of the positioning ring 200a, and the flow disturbance members 230a are arranged annularly. When the motor rotor rotates, the flow disturbance members 230a disturb a flow of the air in the cylindrical housing 100 to generate airflow to cool the motor. In the present embodiment, the securing rib 220a of the positioning ring 200a extends from one side of the flow disturbance member 230a; however, the present invention is not intended to limit the relative relationship between the securing rib 220a and the flow disturbance member 230a.

In the present embodiment, the other positioning ring 200b is attached to the flange 110 of the cylindrical housing 100. One side of the positioning ring 200b is attached to the flange 110. A plurality of second screw holes 201b corresponding to the first screw holes 104b are formed on the positioning ring 200b. The first screw holes 104b and the second screw holes 201b corresponding thereto are for insertion of screws, so as to screw the positioning ring 200b onto the flange 110 of the cylindrical housing 100. A ring-shaped baffle wall 240 protrudes from the other side of the positioning ring 200b. A plurality of flow disturbance members 230b protrudes from an outer circumferential edge of the baffle wall 240. Each of the flow disturbance members is a blade extending from the outer circumferential edge of the baffle wall 240. Each of the flow disturbance members 230b is inclined with a radial direction of the positioning ring 200b, and the flow disturbance members 230b are arranged annularly. When the motor rotor rotates, the flow disturbance members 230b disturb a flow of the air nearby to generate airflow to cool the motor.

The magnets 300 are disposed in the cylindrical housing 100. Each of the magnets 300 is elongated rectangular in shape and has an arc cross-section. The magnets 300 are each clamped between any adjacent flexible ribs 210a/210b on the positioning rings 200a/200b. The flexible ribs 210a/210b are radially pressable, thereby exerting elastic forces to clamp and fix the magnets 300, so that two ends of each magnet 300 are positioned by the positioning rings 200a, 200b respectively, and accordingly the magnets 300 are arranged annularly along an inner wall of the cylindrical housing 100.

Figure 12:
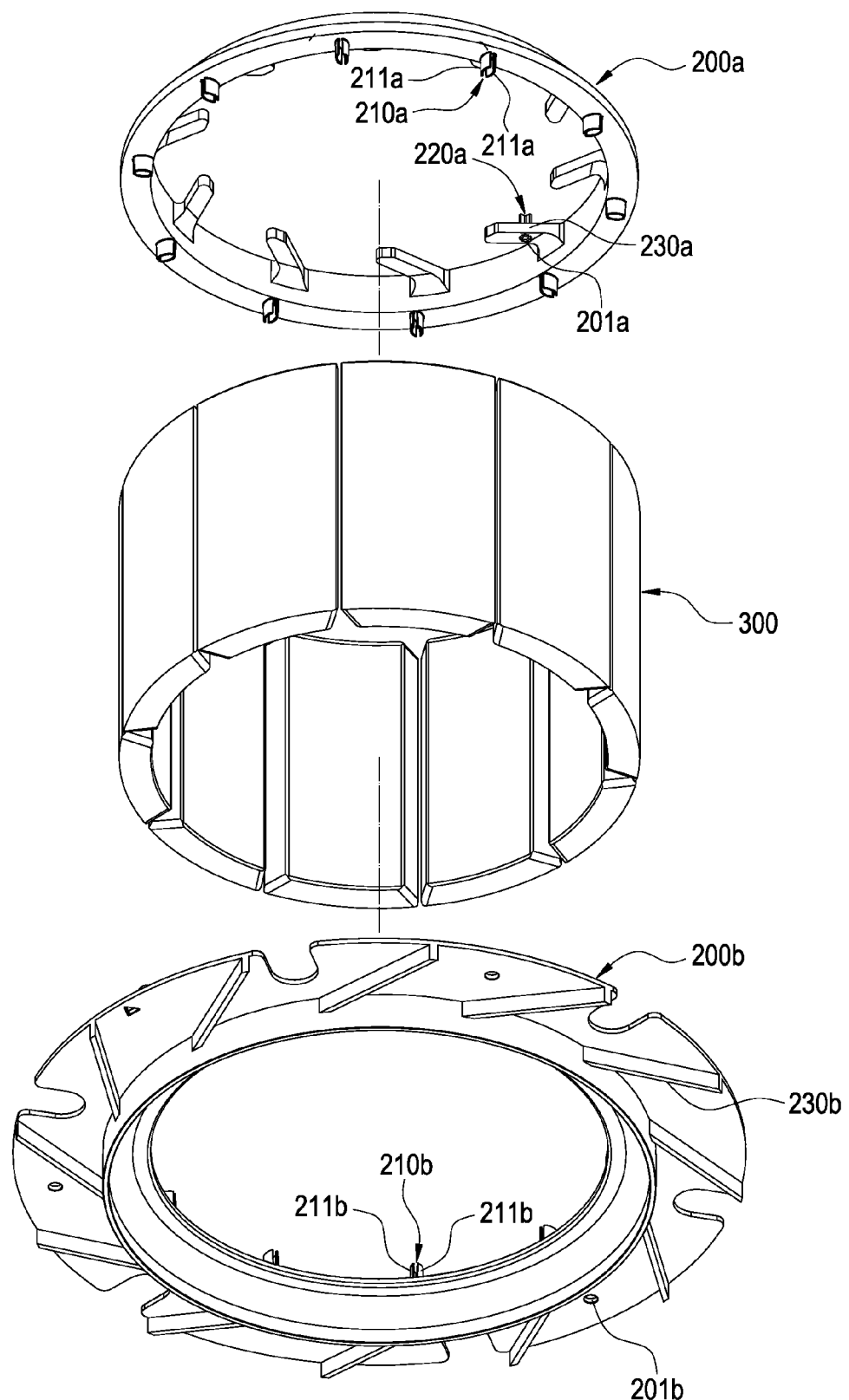
FIG. 12 is a perspective exploded view showing another form of the motor rotor according to the second embodiment of the present invention.
Figure 13:
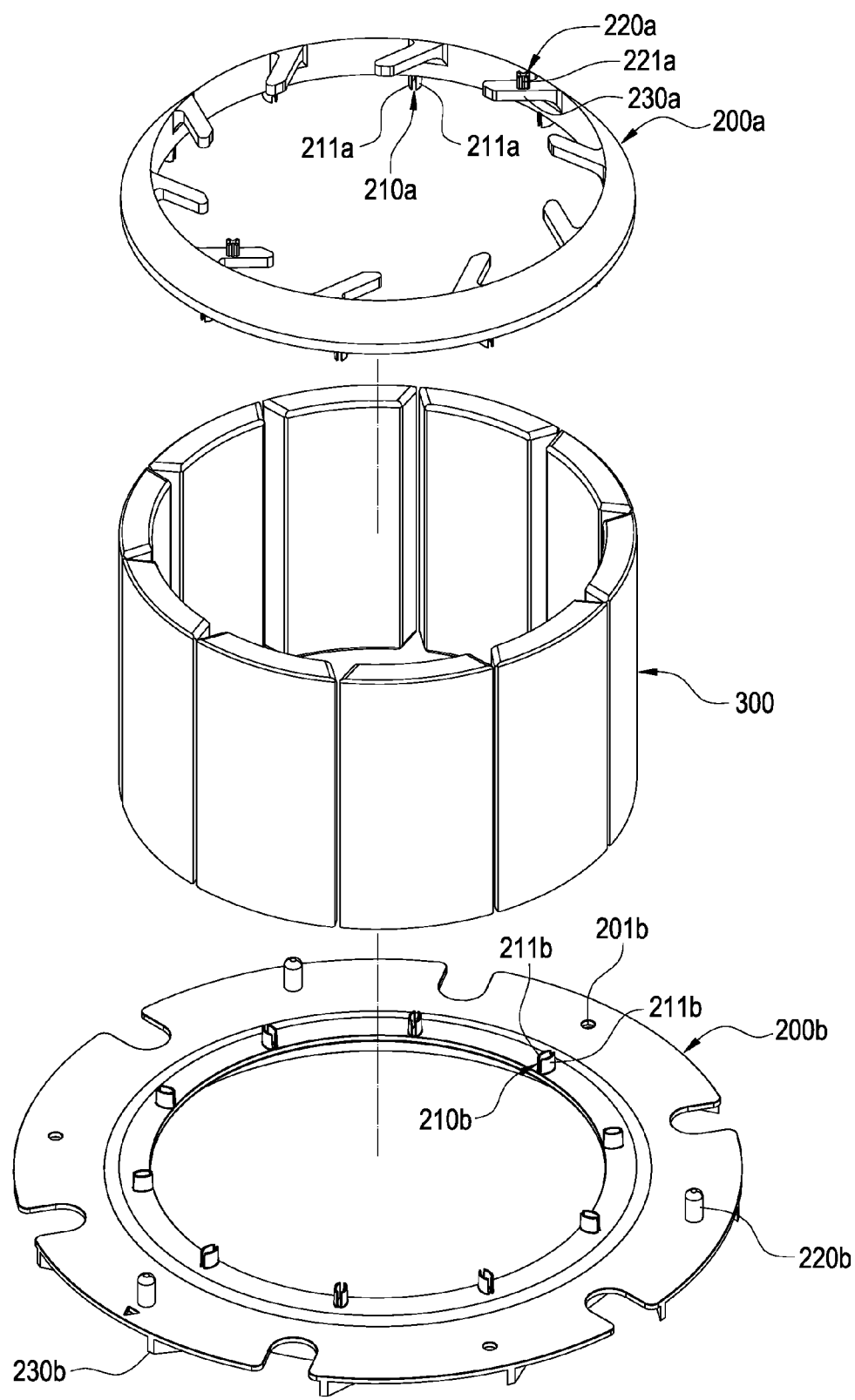
FIG. 13 is another perspective exploded view showing another form of the motor rotor according to the second embodiment of the present invention.

The present invention is not intended to limit the inclination direction of the flow disturbance member 230a/230b with respect to the positioning ring 200a/200b. According to the predetermined rotation direction of the motor rotor, the flow disturbance members 230a/230b can be inclined along a different direction as shown in FIGS. 12 and 13.

Figure 14:
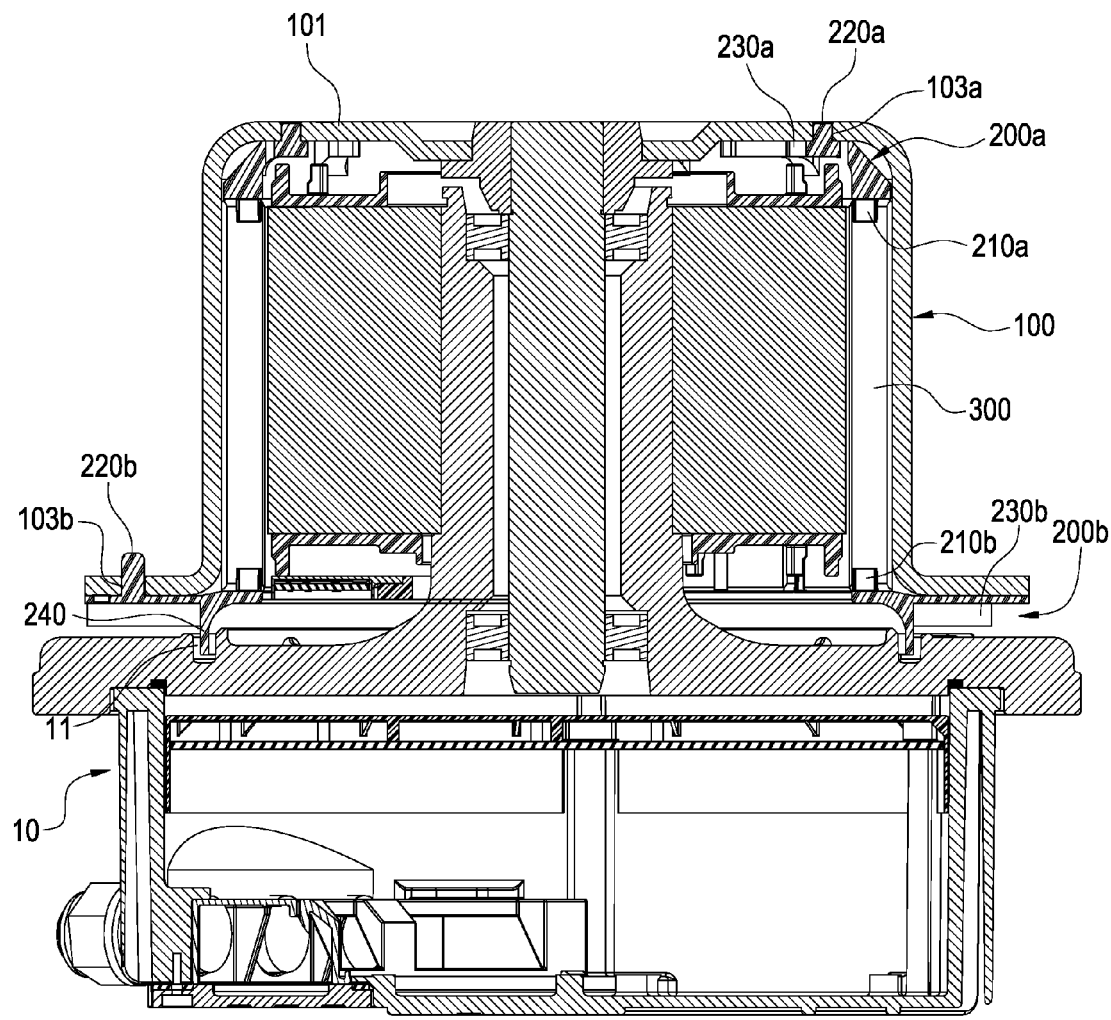
FIG. 14 is an installation view of the motor rotor according to the second embodiment of the present invention.
Figure 15:
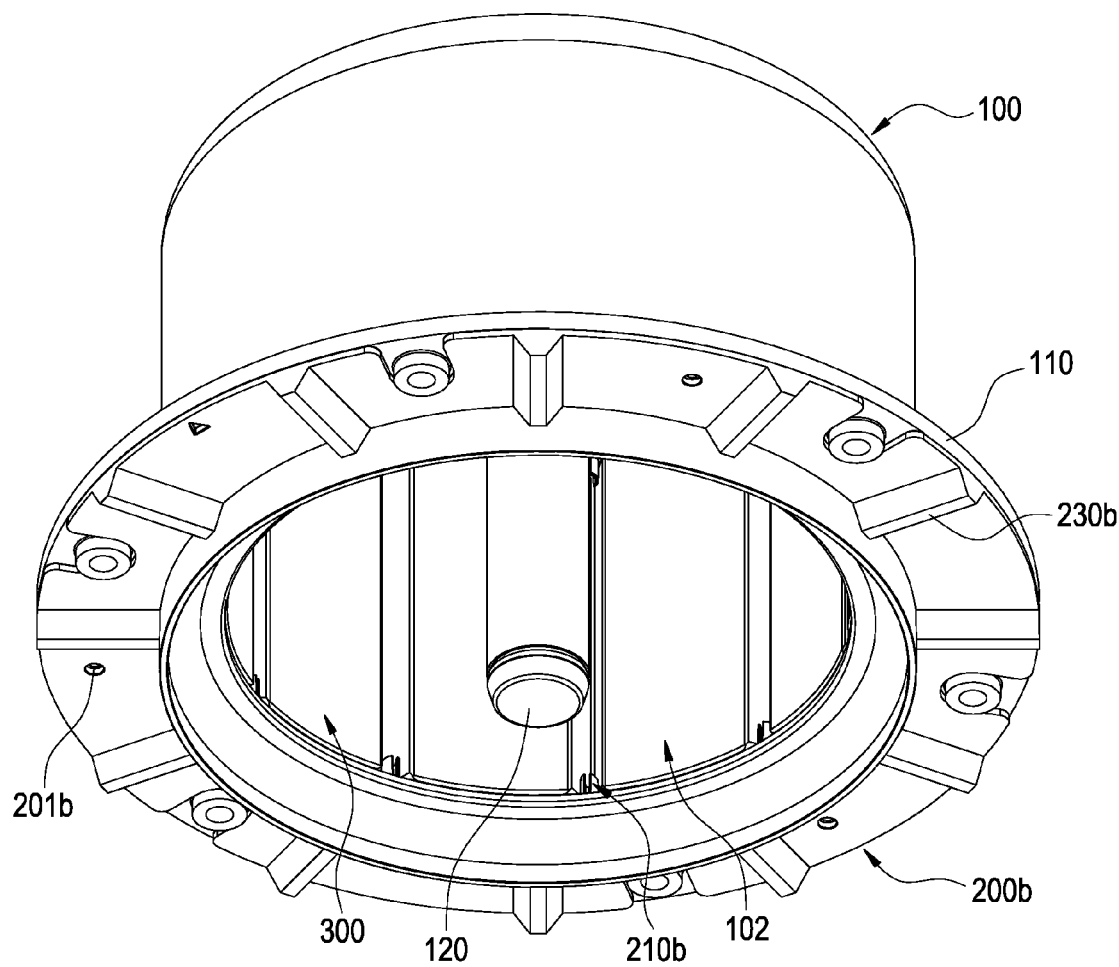
FIG. 15 is a perspective view of a motor rotor according to a third embodiment of the present invention.
Figure 16:
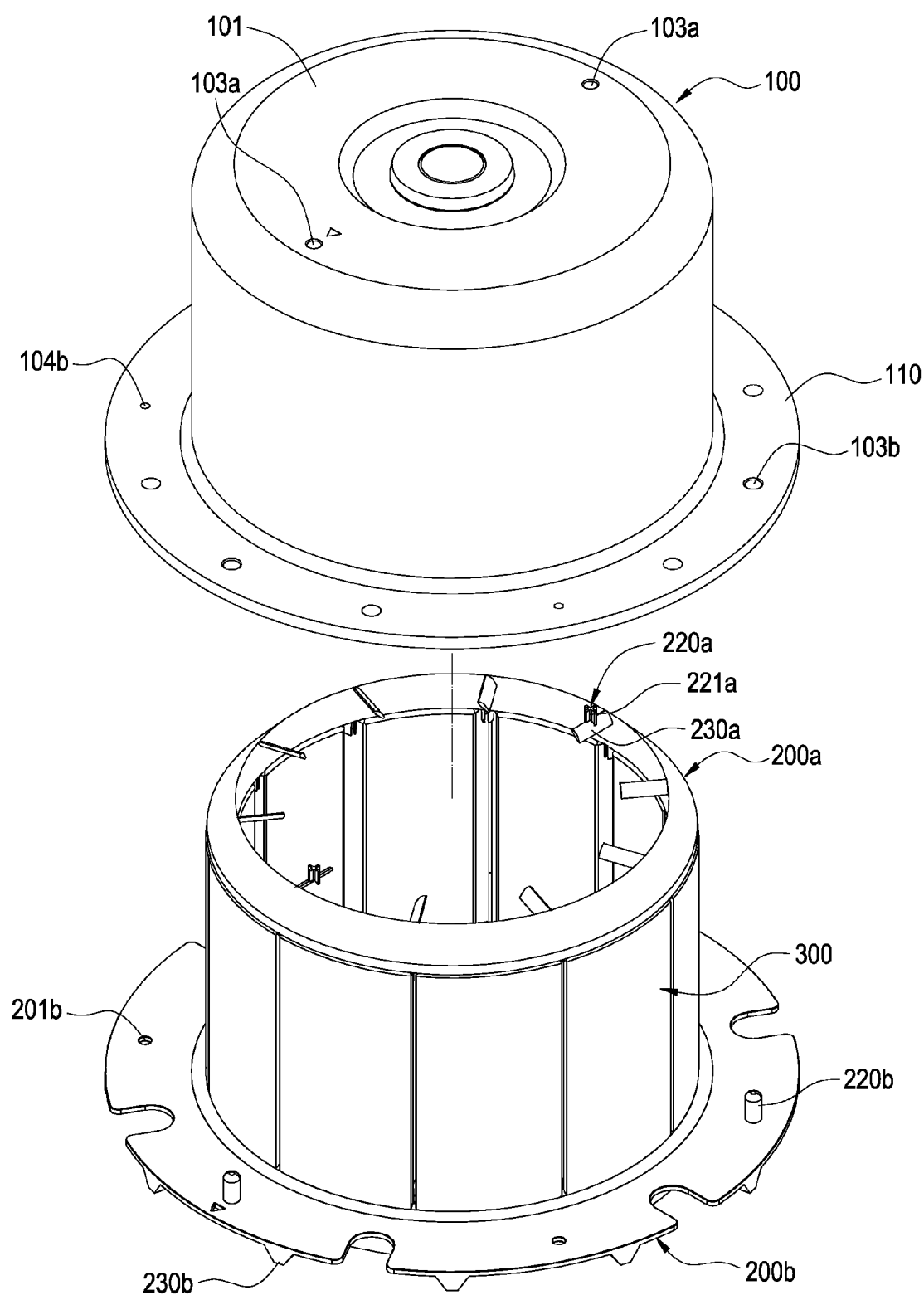
FIG. 16 is a perspective exploded view of the motor rotor according to the third embodiment of the present invention.
Figure 17:
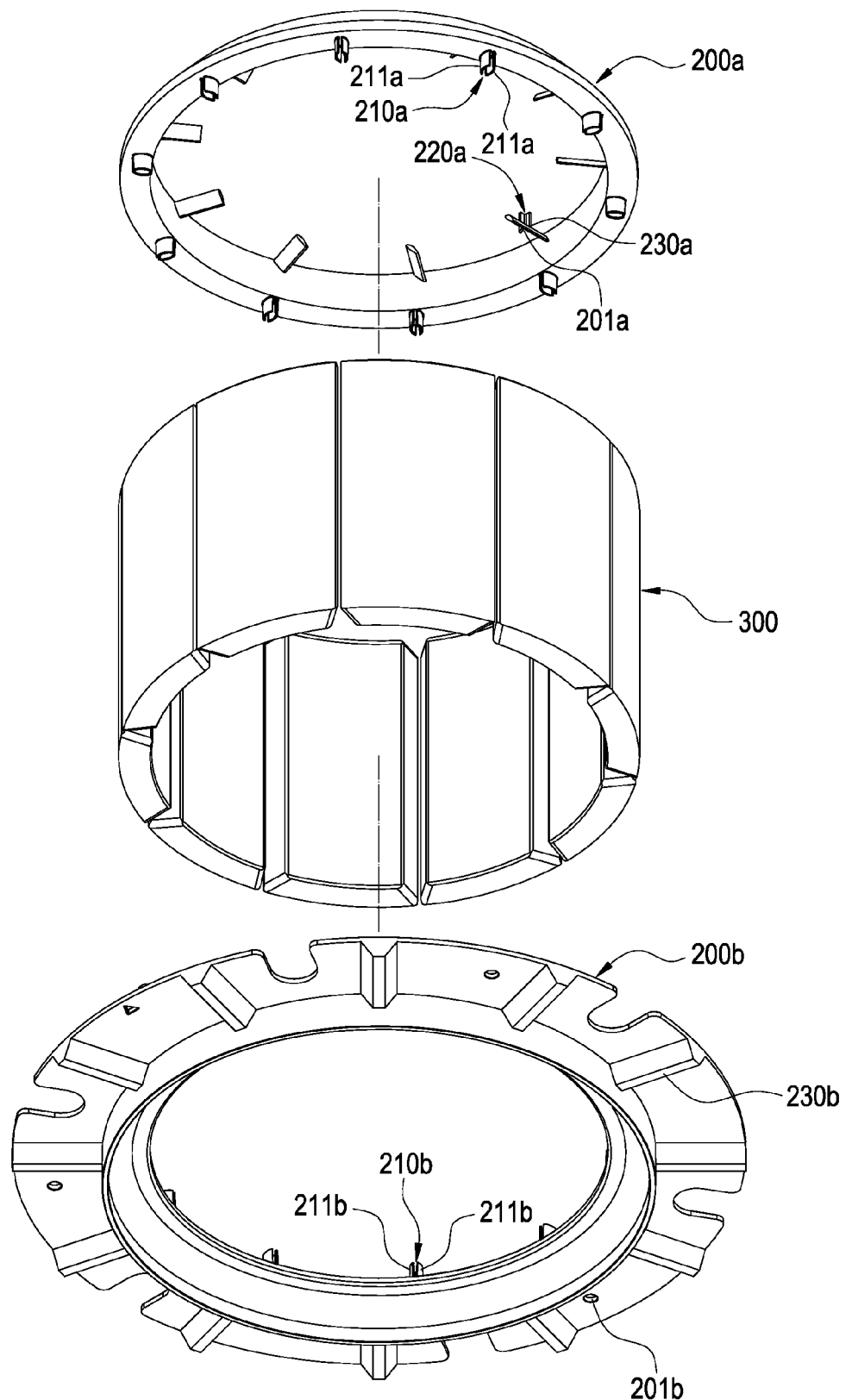
FIG. 17 is a perspective exploded view of the motor rotor according to the third embodiment of the present invention.
Figure 18:
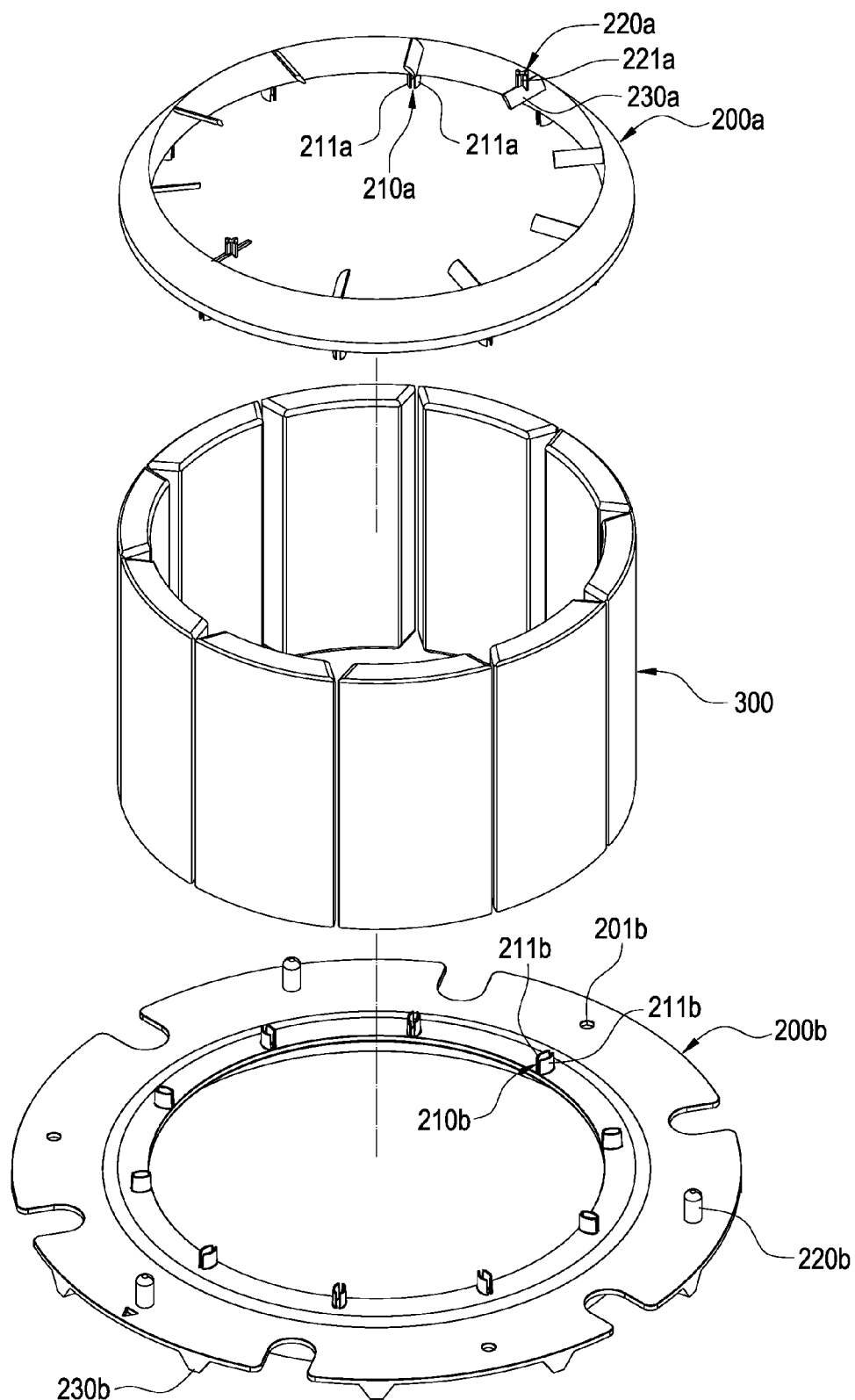
FIG. 18 is another perspective exploded view of the motor rotor according to the third embodiment of the present invention.

Referring to FIG. 14, the motor rotor is pivotally disposed on the stator base 10 by means of the rotation shaft 120, so rotatable on the stator base 10. A ring-shaped waterproof trench 11 is disposed on the stator base 10. The baffle wall 240 on the positioning ring 200b extends into the ring-shaped waterproof trench 11, so as to prevent most of the water from entering into between the motor rotor and the stator base 10 when the motor rotor rotates.

Referring to FIGS. 15 to 18, the third embodiment of the present invention provides a motor rotor which includes a cylindrical housing 100, a pair of positioning rings 200a, 200b and a plurality of magnets 300

In the present embodiment, the cylindrical housing 100 is a metallic cylinder. One end of the cylindrical housing 100 has a top portion 101 and is closed. The other end of the cylindrical housing 100 is open and forms an opening 102. A ring-shaped flange 110 extends outwardly from an outer circumferential edge of the opening 102 along a radial direction of the cylindrical housing 100. A plurality of securing holes 103a corresponding to the positioning ring 200a and a plurality of securing holes 103b corresponding to the positioning ring 200b are formed on the cylindrical housing 100. In the present embodiment, the securing holes 103a corresponding to the positioning ring 200a are formed on the top portion 101 of the cylindrical housing 100. The securing holes 103b corresponding to the other positioning ring 200b are formed on the flange 110 of the cylindrical housing 100. A plurality of first screw holes 104b are formed on the flange 110. A rotation shaft 120 is disposed in the cylindrical housing 100. The rotation shaft 120 extends from an inner surface of the top portion 101 of the cylindrical housing 100 to the opening 102 and is disposed along an axial direction of the cylindrical housing 100.

The positioning rings 200a and 200b are disposed on the cylindrical housing 100. A plurality of flexible ribs 210a/210b is disposed on the positioning ring 200a/200b, and a plurality of securing ribs 220a/220b is disposed on the positioning ring 200a/200b. The flexible ribs 210a extend parallel to an axial direction of the positioning ring 200a, and the flexible ribs 210b extend parallel to an axial direction of the positioning ring 200b. The flexible ribs 210a and 210b are disposed in the cylindrical housing 100. In the present embodiment, each flexible rib 210a/210b preferably consists of two arc members 211a, 211b which are arranged juxtaposed and spaced apart, so the flexible rib 210a/210b is radially pressable; however, the present invention is not intended to limit the form of the flexible rib 210a/210b. The securing ribs 220a are disposed corresponding to the securing holes 103a, and the securing ribs 220b are disposed corresponding to the securing holes 103b. The securing ribs 220a/220b extend parallel to the axial direction of the positioning ribs 200a/200b. Each of the securing ribs 220a/220b is inserted in a respective corresponding one of the securing holes 103a/103a so as to fix the positioning ring 200a/200b to the cylindrical housing 100.

In the present embodiment, the positioning ring 200a is disposed in the cylindrical housing 100, and each securing rib 220a on the positioning ring 200a is inserted into a respective corresponding one of the securing holes 103a on the top portion 101 of the cylindrical housing 100, and such that the positioning ring 200a is secured to an inner wall of the top portion 101 of the cylindrical housing 100. In order to prevent water accumulation on the top portion 101 of the cylindrical housing 100, a bottom portion of each of the securing ribs 220a includes at least one drainage hole 201a penetrating through the positioning ring 200a. (In the present embodiment, there is preferably a plurality of the drainage holes 201a.) A lateral side of each of the securing ribs 220a is formed with a drainage trench 221a longitudinally passing through the securing rib 220a, and each of the drainage trenches 221a communicates with the drainage hole 201a. Therefore, when water is accumulated on the top portion 101 of the cylindrical housing 100, the accumulated water passes through the drainage hole 201a and the drainage trench 221a to drain out of the cylindrical housing 100. A plurality of flow disturbance members 230a extend from an inner circumferential surface of the positioning ring 200a. Each of the flow disturbance members 230a is a blade, and the flow disturbance members 230a are arranged annularly. When the motor rotor rotates, the flow disturbance members 230a disturb a flow of the air in the cylindrical housing 100 to generate airflow to cool the motor. In the present embodiment, the securing rib 220a of the positioning ring 200a extends from one side of the flow disturbance member 230a; however, the present invention is not intended to limit the relative relationship between the securing rib 220a and the flow disturbance member 230a.

In the present embodiment, the other positioning ring 200b is attached to the flange 110 of the cylindrical housing 100. One side of the positioning ring 200b is attached to the flange 110. A plurality of second screw holes 201b corresponding to the first screw holes 104b are formed on the positioning ring 200b. The first screw holes 104b and the second screw holes 201b corresponding thereto are for insertion of screws, so as to screw the positioning ring 200b onto the flange 110 of the cylindrical housing 100. A ring-shaped baffle wall 240 protrudes from the other side of the positioning ring 200b. A plurality of flow disturbance members 230b are disposed on an outer circumferential edge of the baffle wall 240. Each of the flow disturbance members 230b is a blade extending along a radial direction of the positioning ring 200b, and the flow disturbance members 230b are arranged in a radial pattern. When the motor rotor rotates, the flow disturbance members 230b disturb a flow of the air nearby to generate airflow to cool the motor. Furthermore, after the motor rotor and the stator base are assembled together, the baffle wall 240 prevents a great amount of water from entering into the motor rotor.

The magnets 300 are disposed in the cylindrical housing 100. Each of the magnets 300 is elongated rectangular in shape and has an arc cross-section. The magnets 300 are each clamped between any adjacent flexible ribs 210a/210b on the positioning rings 200a/200b. The flexible ribs 210a/210b are radially pressable, thereby exerting elastic forces to clamp and fix the magnets 300, so that two ends of each magnet 300 are positioned by the positioning rings 200a, 200b respectively, and accordingly the magnets 300 are arranged annularly along an inner wall of the cylindrical housing 100.

Figure 19:
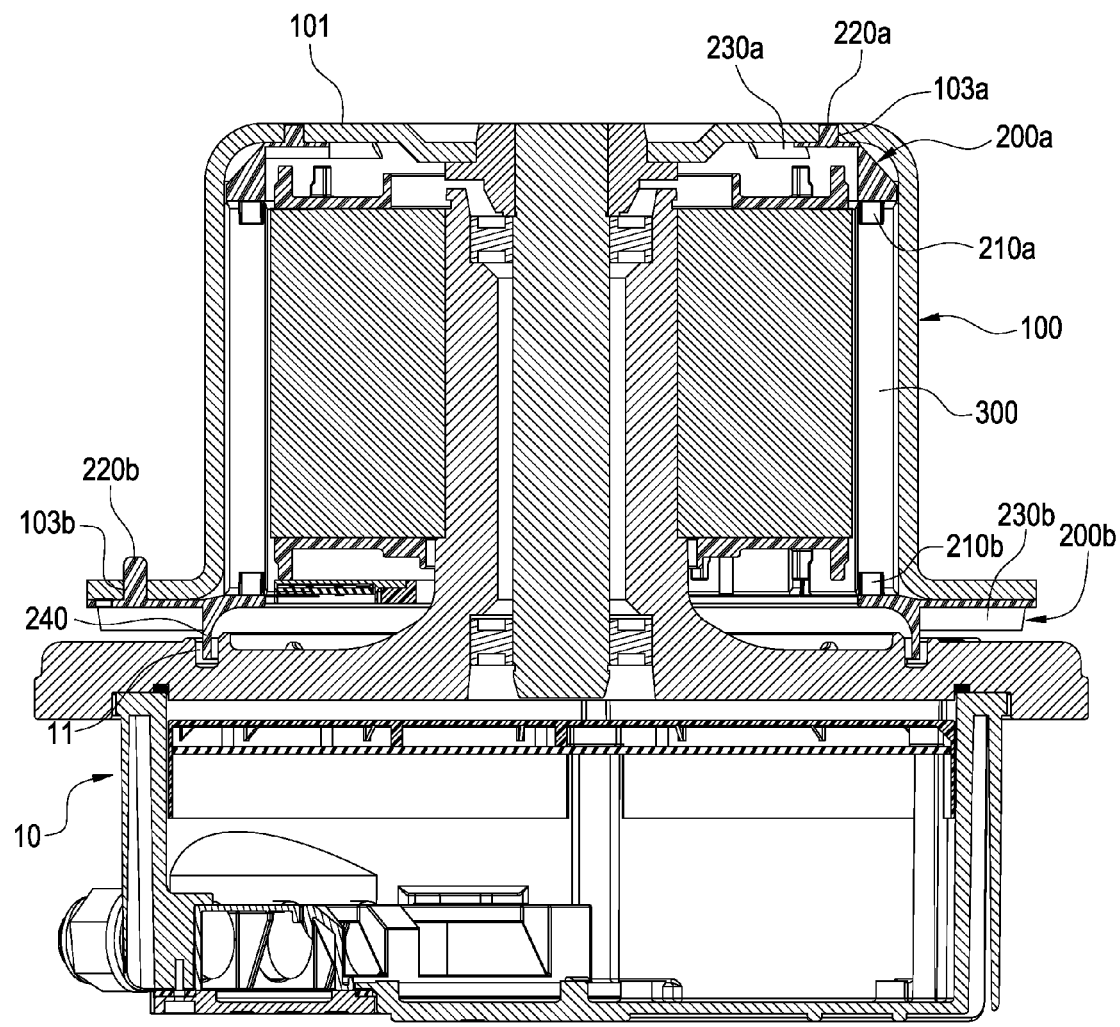
FIG. 19 is an installation view of the motor rotor according to the third embodiment of the present invention.

Referring to FIG. 19, the motor rotor is pivotally disposed on the stator base 10 by means of the rotation shaft 120, so rotatable on the stator base 10. A ring-shaped waterproof trench 11 is disposed on the stator base 10. The baffle wall 240 on the positioning ring 200b extends into the ring-shaped waterproof trench 11, so as to prevent most of the water from entering into between the motor rotor and the stator base 10 when the motor rotor rotates.

In the motor rotor of the present invention, by means of the positioning ring 200a/200b, the magnets 300 can be arranged and assembled into the cylindrical housing 100 with ease. To accomplish the assembly, first the positioning ring 200a is fixed to the top portion 101 in the cylindrical housing 100. Next, the magnets 300 are disposed in the cylindrical housing 100, and one end of each magnet 300 is clamped between the adjacent flexible ribs 210a on the positioning ring 200a. Then, the other positioning ring 200b is assembled and fixed on the flange 110 of the cylindrical housing 100, and at the same time the other end of each magnet 300 is clamped by the flexible ribs 210b on the positioning ring 200b. Accordingly, the magnets 300 can be arranged and assembled quickly in the cylindrical housing 100. Compared with conventional techniques which adhering the magnets one by one, the assembly of the present invention is quick and efficient.

Moreover, the present invention can selectively utilize only one positioning ring 200a. For example, first, the positioning ring 200a is fixed to the top portion 101 in the cylindrical housing 100. Then, the magnets 300 are disposed in the cylindrical housing 100, one end of each magnet 300 is clamped and fixed between the adjacent flexible ribs 210a on the positioning ring 200a, and the magnets 300 are adhered to be fixed in the cylindrical housing 100.

It is to be understood that the above descriptions are merely preferable embodiments of the present invention and are not intended to limit the scope of the present invention. Equivalent changes and modifications made in the spirit of the present invention are regarded as falling within the scope of the present invention.

What is claimed is:
1. A motor rotor, comprising:
  a cylindrical housing, the cylindrical housing being formed of a plurality of securing holes;
  a positioning ring disposed on the cylindrical housing, the positioning ring being disposed with a plurality of flexible ribs extending parallel to an axial direction of the positioning ring and a plurality of securing ribs disposed corresponding to the securing holes, each of the flexible ribs being radially pressable, each of the flexible ribs being disposed in the cylindrical housing, each of the securing ribs extending parallel to the axial direction of the positioning ring, and each of the securing ribs being inserted in a respective corresponding one of the securing holes; and a plurality of magnets disposed in the cylindrical housing, each of the magnets being clamped between the adjacent flexible ribs and being arranged annularly along an inner wall of the cylindrical housing.

2. The motor rotor of claim 1, wherein a bottom portion of the securing rib is formed with a drainage hole penetrating through the positioning ring.

3. The motor rotor of claim 2, wherein the securing hole penetrates through the cylindrical housing, and the securing rib is formed with a drainage trench longitudinally passing through the securing rib and communicating with the drainage hole.

4. The motor rotor of claim 1, wherein a ring-shaped baffle wall protrudes from the other end of the positioning ring, and a plurality of flow disturbance members are disposed on an outer circumferential edge of the baffle wall and are arranged radially.

5. The motor rotor of claim 4, wherein the flow disturbance member is a blade.

6. The motor rotor of claim 4, wherein the flow disturbance member is inclined with respect to a radial direction of the positioning ring.

7. The motor rotor of claim 1, wherein one end of the cylindrical housing is closed and forms a top portion, and the securing hole is formed on the top portion.

8. The motor rotor of claim 1, wherein one end of the cylindrical housing forms an opening, a ring-shaped flange extends from an outer circumferential edge of the opening, and the securing hole is formed on the flange.

9. The motor rotor of claim 8, wherein a plurality of first screw holes are formed on the flange, and a plurality of second screw holes corresponding to the first screw holes are formed on the positioning ring.

10. The motor rotor of claim 1, wherein a rotation shaft is disposed in the cylindrical housing along an axial direction thereof.

11. The motor rotor of claim 4, wherein the motor rotor is pivotally disposed on a stator base, so rotatable on the stator base, a waterproof trench is disposed on the stator base, and the baffle wall extends into the waterproof trench.

12. A positioning ring, configured to position a plurality of magnets of a motor rotor in a cylindrical housing thereof, wherein the positioning ring includes a plurality of flexible ribs disposed parallel to an axial direction of the positioning ring and includes a plurality of securing ribs, the flexible ribs are disposed in the cylindrical housing, each of the flexible ribs is radially pressable, the flexible ribs extend in a direction opposite to that in which the securing ribs extend, each of the magnets is clamped between the adjacent flexible ribs, and each of the positioning rib is engaged with the cylindrical housing.

13. The positioning ring of claim 12, wherein a bottom portion of the securing rib includes a drainage hole penetrating through the positioning ring.

14. The positioning ring of claim 13, wherein the securing rib includes a drainage trench communicating with the drainage hole.

15. The positioning ring of claim 13, wherein a plurality of flow disturbance members are disposed on the positioning ring and are arranged in a radial pattern, and the flow disturbance member is a rib.

16. The positioning ring of claim 15, wherein the flow disturbance members are inclined with respect to a radial direction of the positioning ring.

17. The positioning ring, configured to position a plurality of magnets of a motor rotor in a cylindrical housing thereof, wherein one end of the positioning ring is disposed with a plurality of flexible ribs extending along an axial direction of the positioning ring and is disposed with a plurality of securing ribs extending in the same direction as the flexible ribs, the flexible ribs are disposed in the cylindrical housing, each of the flexible ribs are radially pressable, each of the magnets is clamped between the adjacent flexible ribs, and the securing ribs are engaged with the cylindrical housing.

18. The positioning ring of claim 17, wherein a ring-shaped baffle wall protrudes from the other end of the positioning ring, a plurality of flow disturbance members are disposed on an outer circumferential edge of the baffle wall, and the flow disturbance members are arranged in a radial pattern.

19. The positioning ring of claim 18, wherein the flow disturbance member is a blade or rib.

20. The positioning ring of claim 18, wherein the flow disturbance member is inclined with respect to a radial direction of the positioning ring.

* * * * *